United States Patent
Ma et al.

(10) Patent No.: US 6,455,628 B1
(45) Date of Patent: Sep. 24, 2002

(54) TWO COMPONENT DISPERSANT FOR WET MILLING PROCESS

(75) Inventors: Sheau-Hwa Ma, Chadds Ford; Walter Raymond Hertler, Kennett Square, both of PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/968,206

(22) Filed: Oct. 1, 2001

Related U.S. Application Data

(63) Continuation of application No. 08/681,586, filed on Jul. 29, 1996, now abandoned.

(51) Int. Cl.[7] .................. C08L 31/02; C08L 33/08; C08L 33/10; C09D 11/10
(52) U.S. Cl. ............... 524/505; 524/522; 524/523; 523/160
(58) Field of Search ................... 523/160, 161; 106/31.27, 31.28, 31.6; 524/505, 522, 523

(56) References Cited

U.S. PATENT DOCUMENTS

| | | | | |
|---|---|---|---|---|
| 5,085,698 A | * | 2/1992 | Ma et al. | 524/388 |
| 5,310,778 A | * | 5/1994 | Shor et al. | 524/556 |
| 5,519,085 A | * | 5/1996 | Ma et al. | 524/503 |
| 5,772,741 A | * | 6/1998 | Spinelli | 106/31.25 |

* cited by examiner

*Primary Examiner*—Vasu Jagannathan
*Assistant Examiner*—Callie E. Shosho
(74) *Attorney, Agent, or Firm*—Bart E. Lerman

(57) ABSTRACT

A process for preparing an aqueous dispersion by wet milling an aqueous carrier medium, a particulate solid, and a polymeric dispersant; wherein the polymeric dispersant is a combination of at least 50% by weight of a block copolymer; and a random copolymer; and wherein the block and random copolymers are prepared from substantially the same monomers. This invention provides an easy dispersion process for particulate solids, in particular colorants such as pigments or disperse dyes, at higher loadings, and a reduction of dispersion time which improves the productivity. Resulting dispersions have particular utility as inks for ink-jet printers.

11 Claims, No Drawings

TWO COMPONENT DISPERSANT FOR WET MILLING PROCESS

CROSS-REFERENCE TO RELATED APPLICATIONS

This application continuation of co-pending application Ser. No. 08/681,586, filed Jul. 29, 1996, abandoned.

FIELD OF THE INVENTION

This invention relates to an improved wet milling dispersion process using a unique combination of a block copolymer and a random copolymer of similar composition as the dispersant. The process provides higher loading of particulate solids, with smaller particle size and shorter processing times. The dispersions are particularly suited for preparing pigmented inks for ink-jet printers.

BACKGROUND OF THE INVENTION

Water-based pigment dispersions are well known in the art, and have been used commercially for applying films, such as paints, to various substrates. The pigment dispersions generally are prepared by a dry method, such as 2-roll or 3-roll milling, or a wet method, such as media milling. The dry milling method includes a milling step wherein the dispersant and the pigment are intimately mixed and milled utilizing mechanical forces to cause particle size reduction and adsorption of the polymer to the pigment surface; a grinding step wherein the pigment dispersion is reduced to small chips; and an inversion step where the chips are dissolved in an aqueous carrier medium. In the wet milling method, particle size reduction and dispersion stabilization are conducted in one step in the presence of the aqueous carrier medium.

The dispersant used in a wet milling process must effectively wet the pigment surface and achieve a stable pigment dispersion. Random copolymer dispersants have been disclosed for this purpose, wherein the resulting aqueous dispersion is used as an ink-jet printer ink, in U.S. Pat. No. 4,597,794 (Ohta et al.) assigned to Canon. Block copolymer dispersants, having a hydrophobic block that links to the pigment particles and a hydrophilic block, also are disclosed for this purpose in U.S. Pat. No. 5,085,698 (Ma et al.) assigned to DuPont.

Block copolymer dispersants offer improved dispersion stability (compared to random polymer dispersants) because they provide both a charge double layer and steric stabilization. The block copolymers are difficult to manufacture, however, and tend to form stable micelles in the dispersion due to their structure. These micelles, with the hydrophobic pigment-binding segments buried in the core, do not wet the pigment surface as effectively as may be desired. Also, the block copolymers tend to have a high viscosity, which hinders the milling process and requires a reduction in pigment loading for successful milling to occur.

Surfactants may be added to facilitate pigment wetting and to reduce dispersion viscosity, thereby addressing the problems discussed above. The addition of surfactants, however, tends to change other physical properties of the dispersion (such as surface tension), and may render the dispersion unsuitable for a desired application. For example, the surfactant may adversely affect dispersion stability; and/or, when the resulting dispersion is used as an ink, the ink tends to have a low surface tension that causes image feathering and general poor print quality.

Accordingly, a need continues for an improved dispersion process for preparing aqueous dispersions in general, and in particular for preparing aqueous pigmented inks that are particularly suited for use in ink-jet printers and contain high-loading levels of small pigment particles.

SUMMARY OF THE INVENTION

It now has been found that the presence of certain random polymers in aqueous particulate dispersions having a block copolymer dispersant enhance wetting of the particles, and enable the particulate loading to be increased without adversely affecting physical properties such as surface tension. Accordingly, in one aspect the invention provides a dispersion having an aqueous carrier medium, at least one particulate solid, and a polymeric dispersant that is a mixture of a block copolymer and a random copolymer, wherein (i) the block and random copolymers are prepared from substantially the same monomers; and (ii) the random copolymer is present in the amount of 1 to 100 parts by weight per 100 parts, by weight, of the block copolymer.

In another aspect, the invention provides a process for preparing an aqueous dispersion by wet milling an aqueous carrier medium, at least one particulate solid, and a polymeric dispersant that is a mixture of a block copolymer and a random copolymer, wherein (i) the block and random copolymers are prepared from substantially the same monomers; and (ii) the random copolymer is present in the amount of 1 to 100 parts by weight per 100 parts, by weight, of the block copolymer. The process achieves high loadings of the particulate solid (e.g., a pigment or disperse dye) during a short time, which improves productivity.

DETAILED DESCRIPTION OF THE INVENTION

The invention provides a unique mixture of a block copolymer to provide the dispersion stability, and a random copolymer of substantially the same composition to enhance the wetting of the surface of the particulate solid. This unique mixture of dispersants allows a higher loading of particulate solid for higher productivity, without adversely affecting the physical properties of the dispersion such as surface tension. For example, the resulting dispersion may contain up to 50% or 60% dispersed solids, based on total weight of the dispersion. This loading of particulate solids is up to twice the amount that can be achieved when the block dispersants are used alone. Resulting pigment dispersions are particularly suited for use with ink jet printers in general, and thermal ink jet printers in particular.

Aqueous Carrier Medium

The aqueous carrier medium is water or a mixture of water or at least one water soluble organic component. Deionized water is commonly used. The organic component may be an organic solvent, polymeric binder, thickener, thixotropic agent, coating aid, etc.

For ink jet inks, the aqueous carrier medium is typically a mixture of water and at least one water-soluble organic solvent. Representative examples of water-soluble organic solvents are disclosed in U.S. Pat. No. 5,085,698. Selection of a suitable mixture of water and water soluble organic solvent depends upon requirements of the specific application, such as desired surface tension and viscosity, the selected pigment, desired drying time, and the type of media substrate onto which the coating or ink will be printed. A mixture of diethylene glycol and deionized water is preferred as the aqueous carrier medium for ink jet inks, with the composition typically containing between 30% and 95% (preferably 60% to 95%) water by weight, based on the total weight of the mixture.

The amount of aqueous carrier medium in the ink is in the range of approximately 70 to 99.8%, preferably at least 94%, based on the total weight of the ink when the particulate solid is an organic pigment, and approximately 25 to 99.8% when the particulate solid is an inorganic pigment.

Particulate Solids

The particulate solid may be an insoluble colorant (such as a pigment or disperse dye), colloidal silver halide, metallic flake, a herbicide, an insecticide, or biomaterials (such as drugs) depending upon the particular application of the dispersion. For example, if the intended use is in an ink or a paint, the particulate solid is an aqueous carrier medium insoluble colorant such as a pigment, disperse dye, or a mixture thereof.

The particulate solid selected must be capable of binding with the hydrophobic portion of the block copolymer. Preferably, the particulate solids have "binding sites" that permit binding with the polymer. Most of the above-mentioned particulate solids have very specific functional groups on their surfaces.

For example, all carbon blacks have chemisorbed oxygen complexes, primarily acidic in nature (e.g. carboxylic, quinonic, lactonic or phenolic groups) on their surfaces to varying degrees, depending on the conditions of manufacture. These acidic groups provide binding sites for dispersants having basic functional groups, such as amine groups. Other pigments have basic surfaces. The pigment itself may contain functional groups, or the surfaces may be modified by compounds containing functional groups such as sulfonic acid, phosphoric acid, and carboxylic acid groups or amine-type of basic groups. All are equally useful for this invention. Furthermore, almost all of the organic color pigments and many of the surface treatment compounds have aromatic features in their structures, providing sites for additional aromatic interactions with the dispersant. Examples of pigments that may be used to form the composition include azo, anthraquinone, thioindigo, oxazine, quinacridone, lakes and toners of acidic or basic dye stuffs, copper phthalocyanine and its derivatives, and various mixtures and modifications thereof.

The particle size has an influence on the dispersion stability. Brownian motion of minute particles helps prevent flocculation and settling. The particle size thus should be selected to optimize the stability of the dispersion, consistent with the other requirements of the intended application for the dispersion.

For example, in ink jet ink applications, the pigment particles need to be sufficiently small to permit free flow of the ink through the ink jet printing device, especially at the ejecting nozzles that usually have a diameter in the range of 10 to 50 microns. In addition, it also is desirable to use small particles for maximum color strength and gloss. The useful range of particle size is approximately 0.005 micron to 15 micron. Preferably, the pigment particle size should range from 0.005 to 1 micron.

Also in the case of pigments, the selected pigment may be used in dry or wet form. For example, pigments are usually manufactured in aqueous media and the resulting pigment is obtained as water-wet presscake. In presscake form, the pigment is not aggregated to the extent that it is in dry form. Thus, pigments in water-wet presscake form do not require as much deaggregation in the process of preparing the inks as dry pigments. Representative commercial dry and presscake pigments that may be selected to advantage are disclosed in the aforementioned U.S. Pat. No. 5,085,698.

Fine particles of metal or metal oxides (such as copper, iron, steel, aluminum, silica, alumina, titania, and the like) may be used in the preparation of magnetic ink jet inks and other coating applications for the electronic industries.

Dispersants

A mixture of at least one block copolymer and at least one random copolymer is used as the dispersant to effectively wet the surface of the particulate solid and to stabilize the dispersion.

Block Copolymer

The block copolymers suitable for practicing the invention include AB, BAB, and ABC structures. They may be anionic, cationic or non-ionic. These block copolymers must contain hydrophobic and hydrophilic blocks and balanced block sizes to contribute to the dispersion stability. Functional groups can be built into the hydrophobic (pigment binding) block for stronger specific interactions between the pigment and the polymer dispersant to provide improved dispersion stability. Preferred AB and BAB block copolymers, and their process of preparation, are disclosed in U.S. Pat. Nos. 5,085,698 and 5,272,201. ABC block copolymers, and their methods of preparation, are disclosed in U.S. Pat. No. 5,219,945 and European Patent Application 0 556 649 A1 published Aug. 28, 1993.

In ABC block copolymers, the B block is a hydrophobic homopolymer or random copolymer that serves to bind with the pigment. The A block is a hydrophilic homopolymer or random copolymer or salt thereof, which is solvated by the aqueous carrier medium and serves to stabilize the dispersion by steric and/or double charge layer mechanisms. The C block is commonly an alkylated poly(oxyethylene) substituted (meth)acrylate that is compatible with common organic water-miscible solvents. The C block provides additional dispersion stability.

The preferred structure of the C block monomer is:

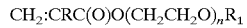

$$CH_2{:}CRC(O)O(CH_2CH_2O)_nR_1$$

wherein R=—H or —CH$_3$; R$_1$=C$_a$H$_{2a+1}$ where a=0–4; n=1–20. Examples of these monomers are ethoxyethyl methacrylate, butoxyethyl methacrylate, and ethoxypolyethyleneglycol methacrylate (polyoxyethylene of MW=44–1000).

The block copolymer is present in at least 50% by weight, preferably 50 to 98% by weight, and more preferably 75 to 98% by weight, based on the total weight of the polymeric dispersant combination of block copolymer and random copolymer.

Random Copolymer

The random copolymer is prepared using substantially the same monomers as those used in preparation of the block copolymers, and should have substantially the same or similar composition as the block copolymer. This means either exactly the same set of monomers or structurally related monomer sets should be used, and about the same percentage per each type of monomers. The ionic character, (anionic, cationic or nonionic) accordingly will be compatible with that of the block copolymer to avoid flocculation. Furthermore, it is preferred that the molecular weight of the random copolymer be close to that of the block copolymer.

The random copolymers may be prepared by any of a number of polymerization methods well known in the art. It is preferred that monomers containing the free acids or free amines of the ionic moieties be polymerized, and the moieties then converted to their salt form after the polymer structure is formed. Exemplary polymerization methods include free radical solution, emulsion, suspension, bulk polymerization and the like (using a chain transfer agent, if necessary). Other polymerization methods include anionic and group transfer polymerization as described in U.S. Pat. No. 4,508,880. Polymers so prepared have precisely controlled molecular weight and very narrow molecular weight distribution.

The random copolymer is present in the range of approximately 0.5 to 50% by weight, preferably 2 to 25%, based on the total weight of the polymeric dispersant combination of block copolymer and random copolymer.

Suitable anionic polymers have a backbone prepared from ethylenically unsaturated units and at least one, and preferably more than three, pendant ionic moieties derived from an anionic unit on the monomer and having the general formula:

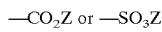

wherein Z is selected from conjugate acids of organic bases, alkali metal ions, ammonium ion, and tetraalkylammonium ions. The number of pendant ionic moieties should be sufficient to make the anionic polymers soluble in the aqueous carrier medium and will vary depending on the molecular weight. For the block copolymers, these pendant ionic moieties are mostly concentrated in the hydrophilic block.

Suitable cationic polymers have a backbone prepared from ethylenically unsaturated units and at least one, and preferably more than three, pendant ionic moieties derived from a cationic unit on the monomer and having of the general formula:

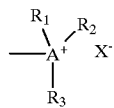

wherein A is N, P, or S; $R_1$, $R_2$ and $R_3$ independently are H, alkyl of 1 to 20 carbon atoms, alkyl ether of 1 to 20 carbon atoms, or aryl of 1 to 9 carbon atoms, or alkylaryl of 1 to 9 carbon atoms, with the proviso that $R_3$ is not present when A is S; and wherein X is an anion selected from the group consisting of halides, conjugate bases of organic acids, and conjugate bases of inorganic acids. The cationic polymers containing phosphonium and sulfonium moieties preferably are made by reacting a halogenated copolymer (e.g., polymer containing 2-bromoethyl methacrylate) with tri-substituted phosphines (e.g., triphenylphosphine) or di-substituted sulfides (e.g., dimethylsulfide). The number of pendant ionic moieties should be sufficient to make the cationic polymer soluble in the aqueous carrier medium and will vary depending on the molecular weight of the polymer. For the block copolymers, these pendant ionic moieties are mostly concentrated in the hydrophilic block.

Strong interaction of a pigment with a dispersant polymer is obtained when the dispersant has one or more attached structures which are the same as the pigment. A common way that this may be accomplished is through general hydrophobic attraction between the polymer and the pigment surface. The pigment often is pretreated with substances that render the surface hydrophobic. A polymer with hydrophobic sites can bind to such a surface through hydrophobic interactions.

A second way in which a dispersant polymer can bind to a solid particulate is through aromatic interactions. If the solid particulate contains aromatic or aromatic-like groups, or if its surface has been pretreated with an aromatic substance, then the aromatic groups in the hydrophobic site can further improve the binding force to the solid particulate.

A third way in which a dispersant polymer can bind to a solid particulate is through ionic bonds. For example, a solid particulate containing sulfonic acid groups can bind strongly to a polymer having basic groups, such as amine groups. Similarly, a pigment containing quaternary ammonium groups can bind to a polymer through acid groups.

Covalent bonding provides a fourth, and especially strong, mode of binding a dispersant polymer to a solid particulate. For example, a solid particulate with carboxylic groups will react with a polymer containing epoxy groups to form ester linkages. Thus, a polymer containing glycidyl methacrylate groups in the hydrophobic site will form strong links to a carboxylic acid-containing solid particulate.

The amount of the dispersant selected depends on the structure, molecular weight, and other properties of the polymers, and upon the pigment type and other components in the pigment dispersion. The dispersant polymers (i.e., both the block and random copolymer components) have a number average molecular weight below 20,000, preferably below 10,000, and typically in the range of 1,500 to 6,000. The polymeric dispersant mixture of block and random copolymers is present in the range of approximately 0.1 to 30% by weight, preferably 0.1 to 15%, based on the total weight of the pigment dispersion composition. If the amount of the dispersant polymers becomes too large, the viscosity will increase and hinder the dispersion process. If too little is present, the dispersion stability is adversely affected. The ratio of block copolymer to random copolymer is in the range of 100 to 1 by weight block copolymer per part random copolymer, preferably 50 to 2.5 parts block copolymer per part random copolymer, based on the weight. The optimal ratio depends on the specific block copolymer and random copolymer that is selected.

Dispersion Process

The dispersion process is a wet milling process. Wet milling means the entire process of deflocculation, size reduction of the particulate solid, and stabilization of the dispersion is carried out in the presence of an aqueous carrier medium. Usually, the selected block and random copolymers are first neutralized/dissolved in the aqueous carrier medium to prepare a polymer solution at about 10 to 25% solids. The block and random copolymer solutions may be prepared separately and combined before use, or a solution of both polymers can be prepared directly. The selected particulate solid is added to the polymer solution, preferably with agitation to prepare a premix.

The deflocculating (i.e., dispersing) step may be accomplished using a conventional media mill with a wide range of media including pebbles, stainless steel beads, glass beads, zirconium beads, plastic particles such as polycarbonate, etc. The type and size of the media selected is determined by the properties of the particulate solid (e.g. the hardness, ease of fracturing the agglomerates), and the desired particle size for the intended use. The conventional mills (including the horizontal mill, ball mill, or attritor) operate mechanically by agitating the media to produce collision and shearing forces among the media. The particulate solid is ground by the media, with new surfaces being generated as the size of the particles are reduced. The dispersant polymers are adsorbed onto these newly generated surfaces, preventing the particles from flocculating together, and thereby stabilizing the dispersion. Alternatively, this step may be accomplished without using media by passing the premix through a plurality of nozzles within a liquid jet interaction chamber, under a liquid pressure of at least 1000 psi, to produce the required collision and shearing forces among the particles to achieve particle size reduction and adherance of the polymeric dispersant onto the newly generated surfaces. Commercial units of this type are available from Microfluidics Corp., Watham, Mass.

Loading of the particulate solid may be as high as 60%, but will generally be in the range of approximately 10 to 50% by weight, based on the total weight of the dispersion. The loading for an inorganic pigment, having a specific gravity higher than the typical organic pigments, may be as high as 75% by weight based on the total weight of the dispersion. Optimal loading of the selected particulate solid for the desired application, and the optimal ratio of the particulate solid to the polymer, is determined by the viscosity of the dispersion and is determined by routine experimentation.

Additives

Depending on the the specific application, various types of additives can be used to modify the properties of these dispersions. Examples include organic cosolvents, coalescing agents, polymeric binders, thickeners, thixotropic agents, surfactants, coating aids, biocides, sequestering agents, and the like.

For ink jet ink applications, anionic, cationic, nonionic, or amphoteric surfactants may be present in the amount of 0.01 to 5%, and preferably 0.2 to 2%, based on the total weight of the ink. Biocides such as Dowicides® (Dow Chemical, Midland, Mich.), Nuosept® (Huls America, Inc., Piscataway, N.J.), Omidines (Olin Corp., Cheshire, Conn.), Nopcocide® (Henkel Corp., Ambler, Pa.), Troysans® (Troy Chemical Corp., Newark, N.J.), and sodium benzoate; sequestering agents such as EDTA; and other known additives, such as humectants, viscosity modifiers and other polymers may also be added to improve various properties of the ink compositions.

In a preferred embodiment, the dispersion is employed as an ink for ink jet ink printers. The preferred formulation for this application is:

(a) aqueous carrier medium: approximately 70% to 96%, preferably 80% to 96%, based on total weight of the ink when an organic pigment is selected; approximately 25% to 96%, preferably 70% to 96%, when an inorganic pigment is selected;

(b) pigments: up to approximately 30% pigment by weight for organic pigments, but generally in the range of approximately 0.1 to 15%, preferably 0.1 to 8%, by weight of the total ink composition; with inorganic pigments (which have higher specific gravities), higher concentrations are employed, and may be as high as 75% in some cases;

(c) dispersant polymer combination: approximately 0.1 to 30% preferably 0.1 to 8%, by weight of the total ink composition.

Many ink performance features such as the drop velocity, separation length of the droplets, drop size, and stream stability are greatly affected by the surface tension and the viscosity of the ink. Pigmented ink jet inks suitable for use with ink jet printing systems typically have a surface tension in the range of about 20 to 70 dyne/cm, preferably 30 to 70 dyne/cm, at 20° C. Acceptable viscosities are no greater than 20 cP, and preferably in the range of about 1.0 cP to about 10 cP, at 20° C.

The invention will now be further illustrated, but not limited, by the following examples.

EXAMPLES

The random and block copolymers were prepared using the following procedures:

A double slash in the copolymer name indicates a separation between the blocks and a single slash indicates a random copolymer. The values recited in parenthesis represent the degree of polymerization for each monomer.

Preparation I: Random copolymer, poly (ethoxytriethyleneglycol methacrylate-co-benzyl methacrylate-co-methacrylic acid), ETEGMA/BzMA/MAA, (4/15/12)

To a solution of 58.6 g (0.253 mol) of 1,1-bis (trimethylsiloxy)-2-methyl-propene and 2.5 g of tetrabutyl ammonium m-chlorobenzoate (1.0M solution in acetonitrile) in 1120 g tetrahydrofuran (dried by passing it through a column of alumina) was slowly added a mixture of 478.8 g (3.03 mol) trimethylsilyl methacrylate, 666.4 g (3.78 mol) of benzyl methacrylate (dried over molecular sieves), and 251.4 g (1.02 mol) of ethoxytriethyleneglycol methacrylate (dried over molecular sieves), in 50 minutes, under nitrogen atmosphere. The temperature rose from 25.4° C. to 73.5° C. during the course of the addition. The mixture was stirred overnight. It was quenched with 250 g of methanol. The mixture was distilled until 1410 g of volatiles were collected and 1440 g of 2-pyrrolidone were added to yield 2857 g of a 42% polymer solution.

The random polymer was neutralized using the following procedure: 476.2 g of the polymer were mixed with 59.6 g of potassium hydroxide solution (46.4% in deionized water) and 1464.2 g of deionized water until a homogeneous 10 polymer solution was obtained.

Preparation II: Block copolymer, poly(methacrylic acid-b-benzyl methacrylate-b-ethoxytriethylene glycol methacrylate), MAA//BzMA//ETEGMA (12//15//4)

To a solution of 146.5 g (0.63 mol) of 1,1-bis (trimethylsiloxy)-2-methyl-1-propene and 3.5 g of tetrabutyl ammonium m-chlorobenzoate (1.0 M solution in acetonitrile) in 3000 g THF was slowly added, 1197.3 g (7.58 mol) of trimethylsilyl methacrylate, in 25 minutes, under nitrogen atmosphere. The temperature rose from 22.3° C. to 51.1° C. during the course of the addition. When the temperature fell to 41.0° C., 70 minutes later, 0.5 mL of tetrabutyl ammonium m-chlorobenzoate was added and no exotherm was detected. To the reaction mixture was then slowly added 1666.1 g (9.46 mol) of benzyl methacrylate (dried over molecular sieves) in 45 minutes. The temperature rose to 61.8° C. during the course of the addition. When the temperature fell to 28.3° C., about 100 minutes later, 0.5 mL of tetrabutyl ammonium m-chlorobenzoate was added and no exotherm was detected. To the reaction mixture was then added 628.6 g (2.56 mol) of ethoxytriethyleneglycol methacrylate (dried over molecular sieves) over 20 minutes. The temperature rose to 31.8° C. The reaction mixture was stirred for 2.5 hours. It was quenched with 525 g of methanol and stirred overnight. The mixture was distilled until 2600 g of volatiles were collected, and 1700 g of 2-pyrrolidone were added. Further distillation removed 924.2 g of volatiles, and another 2351.9 g of 2-pyrrolidone were added to yield a 39% polymer solution.

The block polymer was neutralized using the following procedure: 131 g of the polymer were mixed with 17.6 g of potassium hydroxide solution (46.4% in deionized water) and 482.8 g of deionized water until a homogeneous 10% polymer solution was obtained.

Preparation III: Block copolymer, poly(methacrylic acid-b-benzyl methacrylate-b-ethoxytriethylene glycol methacrylate), MAA//BzMA//ETEGMA (12//18//4)

The polymer was prepared using a procedure similar to that described in Preparation II. A polymer solution of MAA//BzMA//ETEGMA (12//18//4) composition at 39.6% solid in 2-pyrrolidone was obtained.

The block polymer was neutralized using the following procedure: 350 g of the polymer were mixed with 38.3 g of potassium hydroxide solution (45.6% in deionized water) and 536.5 g of deionized water until a homogeneous 15% polymer solution was obtained.

Control 1

A pigment dispersion was prepared using the polymer of Preparation II as the sole dispersant polymer. The polymer solution from Preparation II, 131.0 g, was mixed with 17.63 g of potassium hydroxide solution (46.4% in deionized water), and 482.8 g of deionized water in a high speed disperser Dispermat® FE (BYK-Gardener, Inc., Silver Spring, Md.) for an hour to completely dissolve the polymer. To the polymer solution was added 112.5 g of FW18 carbon black (Degussa Corp., Allendale, N.J.), 6.1 g of Proxel® G (Zeneca Inc., Wilmington, Del.) as biocide, and 150.0 g of deionized water. The mixture at 155% pigment loading was too viscous to process in the high speed disperser. Deionized water was added to dilute the pigment loading to 12.5%. At this concentration, the mixture became a gel. After stirring for about 15 minutes, the viscosity decreased, and the mixture was stirred at about 5000 rpm in the high speed disperser for an additional hour. The mixture was then dispersed in a microfluidizer (Microfluidics Corp., Watham, Mass.) by passing it through the interaction chamber 5 times under a liquid pressure of about 7,000 psi. The resulting pigment dispersion had 12.5% pigment concentration with an average particle size of 122 nm as determined by Brookhaven BI-90 particle sizer. The final pH was 8.54.

Example 1

A pigment dispersion was prepared using a blend of polymers prepared as described in Preparations I and II, in the ratio of 10:90 by weight.

The polymer solution from Preparartion II, 117.9 g (39% in 2-pyrrolidone), and 51.0 g (10% in deionized water)) of the pre-neutralized polymer solution of Preparation I were mixed with 14.29 g of potassium hydroxide solution (46.4% in deionized water), and 328.2 g of deionized water in a high speed disperser Dispermat® FE (BYK-Gardener, Inc., Silver Spring, Md.) for an hour to completely dissolve the polymer. To the polymer solution was added, 112.5 g of FW18 carbon black (Degussa Corp., Allendale, N.J.) and 6.1 g of Proxel® G (Zeneca Inc., Wilmington, Del.). The mixture at 22% pigment loading was stirred at about 5000 rpm in the high speed disperser for an hour. The mixture was then dispersed in a microfluidizer (Microfluidics Corp., Watham, Mass.) by passing it through the interaction chamber 5 times under a liquid pressure of about 7,000 psi. The resulting pigment dispersion had 22% pigment concentration with an average particle size of 107 nm as determined by Brookhaven BI-90 particle sizer. The final pH was 8.15.

With the polymer blend as the dispersant, the dispersion was more easily processed at a higher pigment loading, and the resulting particle size was smaller compared to the control.

Example 2

A pigment dispersion was prepared using a blend of polymers prepared as described in Preparation I and II in the ratio of 5:95 by weight.

The polymer solution from Preparartion II, 124.5 g (39% in 2-pyrrolidone), and 25.55 g (10% in deionized water) of the pre-neutralized polymer solution of Preparation I were mixed with 15.08 g of potassium hydroxide solution (46.4% in deionized water) and 284.9 g of deionized water in a high speed disperser Dispermat® FE (BYK-Gardener, Inc., Silver Spring, Md.) for an hour to completely dissolve the polymer. To the polymer solution was added, 112.5 g of FW18 carbon black (Degussa Corp., Allendale, N.J.) and 6.1 g of Proxel® G (Zeneca Inc., Wilmington, Del.). The mixture was too viscous to process. It was diluted to 18.9% pigment loading with deionized water. The mixture was stirred at about 5000 rpm in the high speed disperser for an hour. It was then processed in a microfluidizer (Microfluidics Corp., Watham, Mass.) by passing it through the interaction chamber 5 times under a liquid pressure of about 7,000 psi. The resulting pigment dispersion had 18.9% pigment concentration with an average particle size of 106 nm as determined by Brookhaven BI-90 particle sizer. The final pH was 8.17.

With the polymer blend as the dispersant, the dispersion was more easily processed at a higher pigment loading, and the resulting particle size was smaller compared to the control.

Control 2

A pigment dispersion was prepared using the polymer of Preparation III.

133.3 g (15% solution) of the pre-neutralized polymer solution of Preparation III, were stirred with 226.7 g of deionized water and 40 g of FW18 carbon black (Degussa Corp., Allendale, N.J.) in a high speed disperser Dispermat® FE (BYK-Gardener, Inc., Silver Spring, Md.) at about 6000 rpm for an hour. The mixture at 10% pigment loading was viscous. It was forced through the microfluidizer (Microfluidics Corp., Watham, Mass.) continuously for 90 minutes. No reduction in either particle size or viscosity was accomplished.

Example 3

A pigment dispersion was prepared using a blend of polymers prepared as described in Preparations I and III, in the ratio of 10:90 by weight.

20 g (10% solution) of the pre-neutralized polymer solution of Preparation I, and 120 g (15% solution) of the pre-neutralized polymer solution of Preparation III were mixed with 40 g of FW18 carbon black (Degussa Corp., Allendale, N.J.) and 220 g of deionized water in a high speed disperser Dispermat® FE (BYK-Gardener, Inc., Silver Spring, Md.). The mixture was stirred at about 6000 rpm for an hour. The mixture was then processed in a microfluidizer (Microfluidics Corp., Watham, Mass.) by passing it through the interaction chamber under a liquid pressure of about 7000 psi. It became viscous first, then with further processing the viscosity gradually decreased. The mixture was passed through the interaction chamber 15 times until an average particle size of 114 nm was obtained. The resulting pigment dispersion has a 10% concentration.

The addition of the random copolymer of Preparation I made this mixture processable.

Example 4

A pigment dispersion was prepared using a blend of polymers prepared as described in Preparations I and III, in the ratio of 15:85 by weight.

30 g (10% solution) of the pre-neutralized polymer solution of Preparation I, and 113.3 g (15% solution) of the pre-neutralized polymer solution of Preparation III were mixed with 40 g of FW18 carbon black (Degussa Corp., Allendale, N.J.) and 216.7 g of deionized water in a high speed disperser Dispermant® FE (BYK-Gardener, Inc., Silver Spring, Md). The mixture was stirred at about 6000 rpm for an hour and 10 minutes. The mixture was then easily processed with a microfluidizer (Microfluidics Corp., Watham, Mass.) by passing it through the interaction chamber 8 times under a liquid pressure of about 7000 psi. The resulting pigment dispersion had 10% pigment concentration with an average particle size of 115 nm as determined by Brookhaven BI-90 particle sizer.

The dispersion process was significantly improved by the presence of the random copolymer.

Example 5

An ink was prepared and tested using the following procedure: The pigment dispersion concentrate of Example 1 was letdown with a vehicle solution to give the following composition.

| INGREDIENT | WEIGHT % |
| --- | --- |
| Carbon Black, FW18, (Degussa Corp., Allendale, NJ) | 2.75 |
| Blend of polymers prepared as described in Preparations I and II (10/90). | 1.25 |
| 2-Pyrrolidone, Aldrich Chemical Co., Milwaukee, WI | 5.0 |
| Liponic ® EG-1, Lipo Chemicals Inc., Paterson, NJ. | 4.25 |
| N-Methylpyrrolidone, Aldrich Chemical Co., Milwaukee, WI | 2.0 |
| Zonyl ® FSA (DuPont Co., Wilmington, DE) | 0.05 |
| Proxel ® G (Zeneca Inc., Wilmington, DE) | 0.15 |
| Deionized water | 84.6 |

The ink was filled into a thermal ink jet pen and printed with a Hewlett Packard DeskJet ink jet printer (Hewlett Packard Co., Palo Alto, Calif.) on Gilbert bond paper (25% cotton, Mead Co., Dayton, Ohio). It printed smoothly and the print had an extremely high optical density of 1.50 and sharp edges. The print was waterfast immediately after drying.

The ink stability was determined by measuring the particle size change by Brookhaven BI-90 particle sizer (Brookhaven Instrument Corp., Holtsville, N.Y. 11742) after the ink sample had been subjected to 4 temperature cycles, each consisting of 4 hours at −20° C. and 4 hours at 70° C. The above ink showed no significant change.

Example 6

Example 5 was repeated with the following exception: the pigment dispersion concentrate of Example 3 was used instead of the pigment dispersion concentrate of Example 1.

The ink was filled into a thermal ink jet pen and printed with a Hewlett Packard DeskJet ink jet printer (Hewlett Packard Co., Palo Alto, Calif.) on Gilbert bond paper (25% cotton, Mead Co., Dayton, Ohio). It printed smoothly and the print had an extremely high optical density of 1.55 and sharp edges. The print was waterfast immediately after drying.

The ink appears to be stable. No flocculation was detected after the temperature cycle test.

Example 7

Example 5 was repeated with the following exception: the pigment dispersion concentrate of Example 4 was used instead of the pigment dispersion concentrate of Example 1.

The ink was filled into a thermal ink jet pen and printed with a Hewlett Packard DeskJet ink jet printer (Hewlett Packard Co., Palo Alto, Calif.) on Gilbert bond paper (25% cotton, Mead Co., Dayton, Ohio). It printed smoothly and the print had an extremely high optical density of 1.59 and sharp edges. The print was waterfast immediately after drying.

The ink appears to be stable. No flocculation was detected after the temperature cycle test.

What is claimed is:

1. An aqueous dispersion containing an aqueous carrier medium, a particulate solid, and a polymeric dispersant consisting of a mixture of at least one block copolymer and at least one random copolymer wherein:
   (i) the block and random copolymers are prepared from substantially the same monomers; and
   (ii) the random copolymer is present in the amount of 1 to 100 parts by weight per 100 parts by weight of the block copolymer.

2. The dispersion of claim 1 wherein the copolymers have a number average molecular weight less than 20,000.

3. The dispersion of claim 2 wherein the block copolymer is selected from the group consisting of AB, BAB, and ABC polymers.

4. The dispersion of claim 3 wherein the particulate solid is a colorant and the aqueous carrier medium comprises water and at least one water soluble organic component.

5. The dispersion of claim 4 wherein the copolymers have a number average molecular weight less than 20,000.

6. An ink jet ink consisting essentially of:
   (a) approximately 25 to 99.8% of an aqueous carrier medium comprising water and at least one water soluble organic component;
   (b) approximately 10 to 60% of a particulate colorant having a particle size less than 15 microns; and
   (c) approximately 0.1 to 30% of a polymeric dispersant consisting of a mixture of at least one AB, BAB, or ABC block copolymer and at least one random copolymer wherein:
      (i) the block and random copolymers are prepared from substantially the same monomers; and
      (ii) the random copolymer is present in the amount of 1 to 100 parts by weight per 100 parts by weight of the block copolymer;
   wherein said percentages of components (a), (b) and (c) are of the total ink composition.

7. The ink of claim 6 wherein the copolymers have a number average molecular weight less than 20,000.

8. The ink of claim 6 wherein component (c) is present in the amount of 0.1 to 15% by weight, has a number average molecular weight below 10,000, and the ratio of block copolymer to random copolymer in the range of 100 to 1 parts block copolymer per 1 part random copolymer, by weight.

9. The ink of claim 8 wherein component (a) is present in the amount of 70 to 96% and contains a water-soluble organic solvent.

10. The ink of claim 8 wherein said block copolymer and random copolymer are anionic.

11. The ink of claim 8 wherein said block copolymer and random copolymer are cationic.

* * * * *